UNITED STATES PATENT OFFICE.

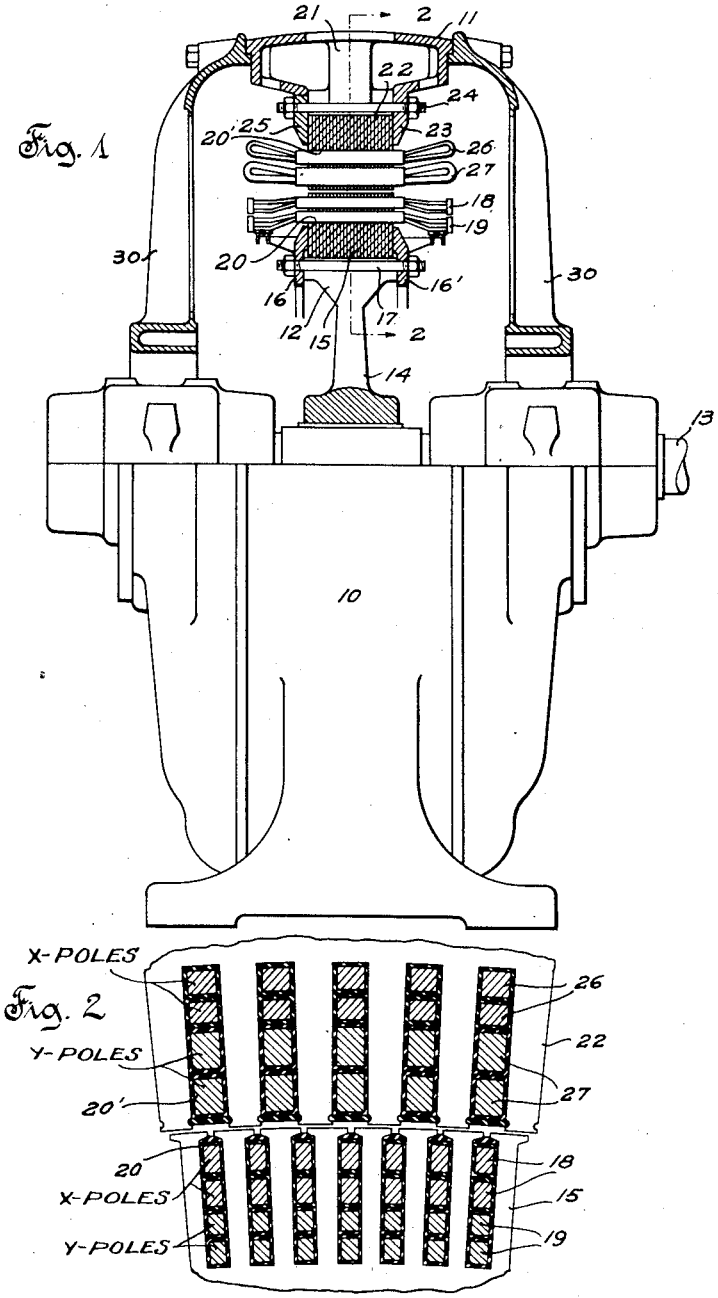

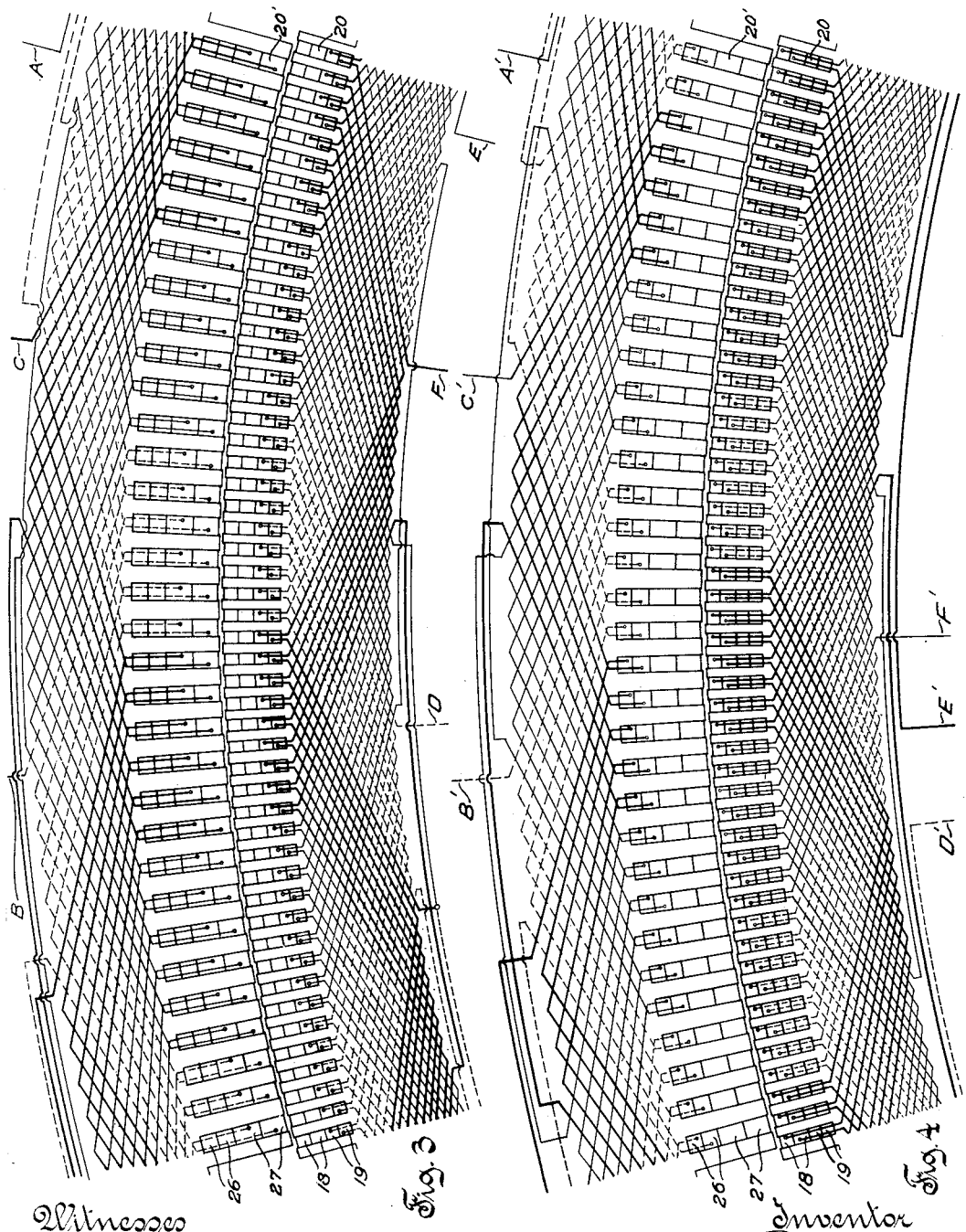

RAE W. DAVIS, OF WEST ALLIS, WISCONSIN, ASSIGNOR, BY MESNE ASSIGNMENTS, TO ALLIS-CHALMERS MANUFACTURING COMPANY, A CORPORATION OF DELAWARE.

MULTISPEED INDUCTION-MOTOR.

1,218,747.         Specification of Letters Patent.     Patented Mar. 13, 1917.

Application filed February 7, 1913. Serial No. 746,929.

*To all whom it may concern:*

Be it known that I, RAE W. DAVIS, a citizen of the United States, residing at West Allis, in the county of Milwaukee and State of Wisconsin, have invented a certain new and useful Improvement in Multispeed Induction-Motors, of which the following is a specification.

This invention relates to motors of the induction type wherein currents flowing in the conductors of one member create a rotating magnetic field, inducing currents in closed circuited conductors of the other member, to produce rotation thereof.

The object of this invention is to produce a motor of this type and of improved design and construction which is capable of efficient operation at a plurality of speeds, and one in which the changes in speed may be accomplished in a manner other than by the insertion of resistance in the circuits of either the primary or the secondary member, or by the variation of the impressed electro-motive force.

It is a further object of this invention to accomplish the desired change in speed by so disposing the windings of the machine that different numbers of effective magnetic poles are produced, and by so disposing the windings of the primary and secondary members relatively to each other that the machine operates at a substantially constant efficiency at all speeds, and is capable of withstanding substantially the same overload conditions.

In accordance with this invention, the primary and secondary members of the motor are each provided with a plurality of windings, preferably of the distributed type, and capable of producing different numbers of effective magnetic poles; and the windings are so disposed in slots in the two members that the losses, due to magnetic leakage in the operation of the machine at the different speeds, are practically the same, one of the several windings on one of the core members being mechanically separate from another winding on such member, that is, coils of one winding are not interlaced throughout with coils of the other winding, or, at least, the slot-occupying portions of one winding occupy the same position in the slots relative to the slot-occupying portions of the other winding. As is well known, the synchronous speed at which an induction motor tends to operate is an inverse function of the number of magnetic poles produced in the primary member, and hence, by varying the number of poles it is possible to change the motor speed.

The various novel features of the invention will appear from the description and accompanying drawings, disclosing one embodiment of such invention, and will be particularly pointed out in the claims.

In the drawings:

Figure 1 is a view in elevation of an induction motor embodying the invention, a portion of the motor being shown in vertical section.

Fig. 2 is a broken section on the line 2—2, of Fig. 1, showing the relative disposition of the conductors of the different windings in the slots of the primary and secondary members.

Fig. 3 is a diagrammatic view of fragments of the primary and the secondary members and showing the relative arrangement of the conductors thereof, and showing the connections for the winding which occupies the outer portion of the slots of the primary member, and the connections for the corresponding winding that occupies the inner portion of the slots of the secondary member, these two windings coöperating in the operation of the machine to produce the lesser number of magnetic poles.

Fig. 4 is a view similar to Fig. 3, but showing the winding occupying the inner portion of the slots of the primary member, and the corresponding winding occupying the outer portion of the slots of the secondary member, and the connections for these windings, these windings coöperating in the operation of the machine to produce the greater number of poles.

In Fig. 1, a motor 10 comprises a primary member or stator 11, and a secondary member or rotor 12, the latter being rigidly connected to a shaft 13 to rotate therewith. The rotor consists of a spider 14, directly connected to the shaft 13, and a core 15 made up of a plurality of laminations, held in place on the periphery of said spider by end plates 16 and 16′ and connecting bolts 17 adapted to draw said laminations together and firmly hold the same in place on the spider. The core 15 is provided with two separate windings 18 and 19, disposed in slots 20 at the periphery thereof. These slots may or may not be of the semi-inclosed type, but are preferably of such type, as the same better insure the retention of the conductors during the operation of the machine.

The stator 11 comprises a frame 21 and a core 22, made up of a plurality of laminations drawn together and held in place against a radial flange 23 of the frame by bolts 24, and an end plate 25. The core is provided with a plurality of separate windings, 26 and 27, disposed in slots 20'. The cores and windings of the machine are protected by end-heads 30 secured to the stator frame 11.

As has been stated, the windings 26 and 27 of the stator, and windings 18 and 19 of the rotor, are separate and distinct, being what might be termed, mechanically separate, in that one winding can be applied to a core member independently of the other winding on such member, and there being a definite division along a cylindrical surface between all the slot-occupying portions of one winding and corresponding portions of another winding on the same member. The machine illustrated is of the three-phase type, but it is obvious that the invention could as well be applied to any type of induction motor. The windings of the different phases are represented in Figs. 3 and 4 by lines of different character, a heavy line representing the winding of one phase, a light line the winding of a second phase, and a dotted line the winding of a third phase. The slots of the stator contain two conductors corresponding to opposite sides of different turns of both windings 26 and 27, these turns being suitably insulated from each other and from the turns of the other winding, and also from the sides of the slots. The slots of the rotor also contain two conductors of each of the windings 18 and 19, suitably insulated from each other and from the other winding and the sides of the slots. The conductors are suitably held in place by retaining strips or wedges of well known construction.

Each slot of the stator contains four insulated conductors, two of them disposed at the inner portion of the slot, as shown in Figs. 2, 3, and 4, representing opposite sides of coils of the winding 26, and the other two disposed at the outer portion of the slots and representing opposite sides of coils of the winding 27. The number of stator coils may be so chosen as to be a multiple of the two numbers of magnetic poles desired to be produced in the operation of the machine. The two windings are placed in position in the slots, the winding 26, adapted to produce the greater number of poles, being at the inner portion of the slots, and winding 27, adapted to produce the lesser number of poles, being at the outer portion of the slots. While this relative arrangement is desirable, it is obvious that the relative positions of the windings might be reversed without affecting the efficient operation of the machine in any very substantial manner. Both of these windings may be of a standard lap type connected in Y, the other ends of the winding being brought out to separate terminal connections.

In the same manner as described above in connection with the stator, the rotor is provided with two separate windings, each adapted to coöperate with one of the windings of the stator in the operation of the machine. The number of slots per hole in the rotor may be the same as in the stator, or may be greater or smaller in which case a more uniform turning moment is exercised on the conductors of the rotor. Figs. 2, 3 and 4 show the ratio between the stator slots and the rotor slots to be 2 to 3 in the present case. Winding 18 of the rotor, which produces a number of poles equal to that produced by the winding 26, disposed in the inner part of the stator slots, namely, the greater number of poles, is disposed in the outer part of the rotor slots; and the winding 19 of the rotor, which produces a number of poles equal to that produced by the winding 27, disposed in the outer portions of the stator slots, is disposed in the inner part of the rotor slots.

The terminals A, B, C of the stator winding 27 and terminals A', B', C' of stator winding 26 are brought out to proper connection points; and the terminals D, E, F of the rotor winding 19 and terminals D', E', F' of the rotor winding 18 are connected to six slip rings on the rotor. Switch means of appropriate design may be provided for connecting the terminals A', B', C' of the stator winding 26 to a three-phase source, and, at the same time, connecting together the terminals D', E', F' of the rotor winding 18, the terminals of the stator winding 27 and the rotor winding 19 being allowed to remain open-circuited. The motor will now operate at a speed substantially corresponding to synchronism for the greater number of poles. When it is desirable to operate the motor at a higher speed, or that corresponding to synchronism for the lesser number of poles, the connection to winding 26 is broken and the short-circuiting connection of winding 18 is broken; and terminals A, B, C of winding 27 are connected to the source and terminals D, E, F of winding 19 are connected together.

It is obvious that with the conductors of the stator and rotor arranged in accordance with this invention, the magnetic path through the stator and rotor is of approximately the same length, independent of which set of windings is in use; and, the air gap being constant, the magnetic leakage will also be approximately the same, independent of which set of windings is in use. This insures that the efficiency of the machine will be approximately the same, no matter at which of its desired speeds the motor is operated, and further, that the overload capacity of the motor will be practically the same, no matter which set of windings is in use.

It is also obvious that the invention is not limited to the use of two sets of stator and rotor windings, but may be extended to three or more sets of windings as long as the magnetic path through the teeth of the stator and rotor cores remains practically the same for the different sets of windings, no matter which set is in use.

It should be understood that it is not desired that the invention should be limited to the exact details of construction shown and described, for obvious modifications will occur to a person skilled in the art.

It is claimed and desired to secure by Letters Patent:

1. In an induction motor, a primary member and a secondary member, each provided with a plurality of separate windings disposed in slots therein, portions of the several windings on each member being disposed in the same slots, a winding on the stator and a winding on the rotor being effective to produce the same number of magnetic poles and corresponding portions of said primary and secondary windings occupying relatively inverted positions in the slots of the two members.

2. In a dynamo-electric machine, a wound stator and a wound rotor, the stator and the rotor being provided with a plurality of mechanically separate sets of windings disposed in the same slots of the stator and rotor and effective to produce different numbers of effective magnetic poles in the operation of the machine, and the stator and rotor portions of each set being separated by approximately the same distance, whereby the magnetic leakage in the operation of the machine is approximately the same for each set.

3. In a polyphase electric motor, the combination of a primary member provided with a plurality of windings disposed in the same slots and adapted to produce different numbers of effective magnetic poles in the operation of the motor, and a secondary member provided with windings disposed in the same slots and equal in number to those of the primary member, each winding of the secondary member being adapted to be closed on itself to coöperate with a certain one of the primary windings to produce a definite speed of operation of the motor, the primary winding for producing one number of magnetic poles being located adjacent the open end of the slots of the primary member, and the corresponding secondary winding being located adjacent the closed end of the slots in the secondary member.

4. In a polyphase electric motor, the combination of a primary member provided with a plurality of mechanically separate windings having portions thereof disposed in the same slots and adapted to produce different numbers of effective magnetic poles in the operation of the motor, and a secondary member provided with windings having portions thereof disposed in the same slots and equal in number to those of the primary member, each winding of the secondary member being adapted to be closed on itself to coöperate with one of the primary windings to produce a definite speed of operation of the motor, and the primary and corresponding secondary portions of the windings that coöperate to produce the different numbers of magnetic poles being separated by approximately the same distance.

5. In a dynamo-electric machine, a wound stator and a wound rotor, the stator and the rotor being provided with a plurality of mechanically separate sets of windings disposed in the same slots and capable of producing different numbers of effective magnetic poles in the operation of the machine, and the stator and rotor portions of each set being disposed at substantially the same distance from the radially inner end of the stator and rotor slots, respectively.

6. In a polyphase electric motor, the combination of a primary member comprising a slotted core and a plurality of sets of coils of different pitch disposed therein for producing corresponding numbers of rotating magnetic fields differing from each other as to the number of poles, portions of each set of coils being disposed in the same slots, and a secondary member comprising a slotted core and a plurality of sets of coils disposed therein, each set capable of producing a number of rotating magnetic fields equal to those produced by one set of coils of the stator member, portions of each of the latter sets of coils being disposed in the same slots, and the sets of coils of the stator and rotor which produce the same number of poles being disposed in substantially the same position relative to the radially inner portion of the respective slots which they occupy.

7. In an induction motor, a primary member, and a secondary member, each being provided with a plurality of mechanically separate windings disposed in slots therein and effective to determine different synchronous speeds of operation of said motor, slot-occupying portions of one winding on each member being disposed nearer the air-gap between said members than slot-occupying portions of the others of said windings, and the average magnetic path between the several windings on the primary member and the corresponding windings on the secondary member through the teeth of the primary and secondary members being of substantially the same length whereby the motor tends to operate at approximately the same efficiency at the different speeds.

8. In an induction motor, a primary member, and a secondary member, each being provided with a plurality of separate windings of different pitch having portions disposed in the same slots in said members and effective to determine different synchronous speeds of operation of said motor, the magnetic paths between the several windings on the primary member and the corresponding windings on the secondary member through the teeth of the primary and secondary members being of approximately the same effective length.

9. In an induction motor, a primary member, and a secondary member, each being provided with a plurality of windings disposed in slots therein and each winding on one member being coöperative with a winding on the other member to determine different synchronous speeds of operation of said motor, substantially all slot-occupying portions of one winding on the primary member lying on one radial side of a substantially cylindrical surface of division and substantially all slot-occupying portions of another winding on said member lying on the opposite radial side of said surface, and substantially all slot-occupying portions of each winding on the secondary member lying in the same position relative to a second substantially cylindrical surface of division as the first mentioned slot-occupying portions of the corresponding coöperative primary winding lie relative to the first mentioned surface of division.

In testimony whereof, the signature of the inventor is affixed hereto in the presence of two witnesses.

RAE W. DAVIS.

Witnesses:
W. H. LIEBER,
J. J. KANE.